United States Patent [19]

Ishii et al.

[11] Patent Number: 4,647,596

[45] Date of Patent: Mar. 3, 1987

[54] MICROCELLULAR POLYURETHANE ELASTOMER AND MANUFACTURING METHOD OF THE SAME

[75] Inventors: Seiji Ishii; Masanori Miyoshi; Takumi Ishiwaka; Osamu Kondo, all of Yokohama, Japan

[73] Assignee: Bridgestone Corporation, Tokyo, Japan

[21] Appl. No.: 856,217

[22] Filed: Apr. 28, 1986

[30] Foreign Application Priority Data

Apr. 27, 1985 [JP] Japan ................................. 60-89931

[51] Int. Cl.$^4$ ............................................. C08G 18/14
[52] U.S. Cl. ..................................... 521/159; 521/904
[58] Field of Search ............................... 521/159, 904

[56] References Cited

U.S. PATENT DOCUMENTS 4,059,659 11/1977 Hilterhaus ........................... 521/159
4,559,366 12/1985 Hostettler ........................... 521/159

Primary Examiner—Maurice J. Welsh
Attorney, Agent, or Firm—Cushman, Darby & Cushman

[57] ABSTRACT

Polyol component essentially consists of polyester-polyetherpolyol containing polyesterpolyol by the weight ratio of 100:0 to 20:80, in which the polyester-polyetherpolyol is a copolymer of polytetramethyleneglycol (PTMG) and ε-caprolactone by the weight ratio of 20:80 to 80:20 with an average molecular weight of 1000 to 3000 and the polyesterpolyol is a condensate of adipic acid as a main acid component with an average molecular weight of 1000 to 3000, is reacted with isocyanate component essentially consists of 4,4'-diphenylmethanediisocyanate (MDI) to make a prepolymer with terminal radical of NCO.

Microcellular polyurethane produced from the prepolymer by foaming and polymerization reaction has the durability for vibration-proof material of car use, combining the advantage of PTMG such as high initial modulus at elongation, low heat built up, low-temperature property and hydrolysis-durability under high humid and hot conditions, with the advantage of polycaprolactone such as good molding property and anti-bending-fatigue property, as well as making up for the disadvantage of both polyols each other. Thus improving the problems of microcellular polyurethane using MDI such as low initial modulus at elongation and high heat built up.

11 Claims, 2 Drawing Figures

MICROCELLULAR POLYURETHANE ELASTOMER AND MANUFACTURING METHOD OF THE SAME

FIELD OF THE INVENTION

This invention relates to a microcellular polyurethane elastomer (hereafter is called microcellular polyurethane) suitable for vibration-proof material with high durability to severe requirement such as repeated compression under heavy load, as is the case of bumpstopper to suspend automotive body, incorporating with excellent low-temperature property and improved hydrolysis durability in humid and hot conditions, and manufacturing method of the microcellular polyurethane with safe and stabilized molding workability and reasonable cost.

DESCRIPTION OF THE PRIOR ART

Microcellular polyurethane has a unique non-linear type elastic property differ from ordinary vulcanized rubber and remarkable vibration and shock absorbing characteristic, so that, it has been used as automotive parts to improve driving stability and cruising comfortability of car.

Recently another characteristic which makes it tolerable to be used in cars running in cold district is also requested.

A well known example of microcellular polyurethane which has been used for such a purpose is as follows;

1,5-naphthalenediisocyanate (NDI) is used as isocyanate component and reacted with polyesterpolyol to make prepolymer with terminal radical of NCO, to which a curing (polymerization) agent containing water is blended and stirred homogeneously to carry out foaming and polymerization reaction to form microcellular polyurethane.

Another known example of microcellular polyurethane with low-temperature property is one in which adipic acid condensate with 1,4-butanediol is used as the polesterpolyol component in the above-mentioned case.

However, microcellular polyurethane produced from NDI as isocyanate component is not only requiring expensive NDI, but has lots of problems such as that pot life of the prepolymer is too short to keep stabilized molding conditions, much labor cost is required as the prepolymer should be prepared each time, and working environment must be controlled carefully as the prepolymer has poisonous odor.

So, a microcellular polyurethane endurable in the condition of repeated compression under heavy load, suitable for vibration-proof material of car use, applying 4,4'-diphenylmethanediisocyanate (MDI) as isocyanate component has been searched for the purpose not only solving out all the problem accompanied with the use of NDI, but also to obtain safe and more stabilized workability and cheaper cost.

For example, in Japanese Patent Public Disclosure Tokkai Sho 57-100121 "Urethane elastomer sponge composition", a condensate of adipic acid with a mixture of ethyleneglycol and butyleneglycol by the weight ratio of 70:30 to 30:70 is used as polyol component to which MDI as isocyanate component is reacted to obtain microcellular polyurethane applicable to the vibration-proof material for automotive use.

However, such a microcellular polyurethane using MDI has low initial modulus at elongation, so it is necessary to raise the density of product very much to keep the static elastic property and strength as those of conventional microcellular polyurethane using NDI.

As the result, it might cause expansion of molded products, badness of dimensional accuracy and other bad molding workability, which, together with the increase of product weight, brings to higher production cost.

In addition, microcellular polyurethane using MDI brings higher heat built up (HBU) when compressed repeatedly, causing deterioration of the material, and remarkable weakening is often observed after repeated compression under constant heavy load.

Accordingly, in order to satisfy the static elastic property and durability at repeated compression under heavy load necessary to the vibration-proof material of car use, specific design of shape at compression is required to avoid higher heat built up. As the result, such a microcellular polyurethane using MDI cannot answer all of the requirement of car use and practical application area has been limited heretofore.

SUMMARY OF THE INVENTION

The object of the present invention is to provide a microcellular polyurethane with safe and stabilized molding workability applicable widely to vibration-proof material such as bumpstopper of car suspension, by improving the problems of microcellular polyurethane using MDI such as low initial modulus at elongation and high heat built up.

The present invention has been accomplished by finding out that the microcellular polyurethane made from polyesterpolyetherpolyol, which is a copolymer of PTMG and ε-caprolactone by the weight ratio of 20:80 to 80:20 with an average molecular weight of 1000 to 3000, has the durability suitable for vibration-proof material of car use, combining the advantage of PTMG such as high initial modulus at elongation, low heat built up, low-temperature property and hydrolysis-durability under humid and hot conditions, with the advantage of polycaprolactone such as good molding property and antibending-fatigue property, as well as making up for the disadvantage of both polyols each other.

BRIEF DESCRIPTION OF THE DRAWINGS

Attached drawings show the hydrolysis-durability of microcellular polyurethane in water vapor at 180° C. about those samples in Examples and Comparative Examples.

DETAILED DESCRIPTION OF THE PREFERRED EMBODIMENTS

Figure 1:
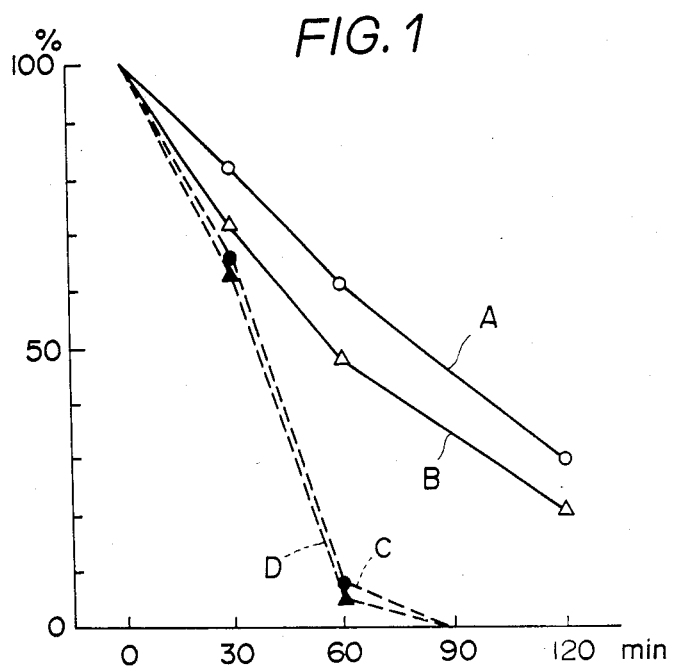
FIG. 1 shows the change of retention rate of modulus at 100% elongation with the lapse of time.

The present invention relates to a microcellular polyurethane elastomer produced by foaming and polymerization reaction of prepolymer with terminal radical of NCO prepared by the reaction of polyol component and isocyanate component, the improvement comprising; the polyol component essentially consists of polyester-polyetherpolyol and polyesterpolyol by the weight ratio of 100:0 to 20:80, in which the polyesterpolyetherpolyol is a copolymer of polytetramethyleneglycol and ε-caprolactone by the weight ratio of 20:80 to 80:20 with an average molecular weight of 1000 to 3000 and the polyesterpolyol is a condensate of adipic acid as a main acid component with an average molecular weight of 1000 to 3000, and the isocyanate component essentially consists of 4,4'-diphenylmethanediisocyanate.

Microcellular polyurethane according to the present invention has not only enough durability to the repeated compression under heavy load, necessary to the vibration-proof material of car use as that of already known microcellular polyurethane made from 1,5-naphthalenediisocyanate (NDI), but has more improved low-temperature property and hydrolysis-durability under humid and hot conditions.

The invention is explained in more detail hereunder; The polyol component using in the present invention consists of polyesterpolyetherpolyol (polyol-1) containing polyesterpolyol (polyol-2) by weight ratio of 100:0 to 20:80, in which polyol-1 is a copolymer of polytetramethyleneglycol (PTMG) and ε-caprolactone by the weight ratio of 20:80 to 80:20, preferably within the range of 50:50 to 70:30, with an average molecular weight of 1000 to 3000, preferably 1500 to 2500, more preferably around 2000, and polyol-2 is a high molecular weight condensate of adipic acid as a main acid component with an average molecular weight of 1000 to 3000, preferably 1500 to 2500, more preferably around 2000, and the isocyanate component essentially consists of 4,4'-diphenylmethanediisocyanate.

The above-mentioned polyol component is reacted with 4,4'-diphenylmethanediisocyanete to make prepolymer with terminal radical of NCO, to which water as a foaming and polymerization agent is added and stirred homogeneously to carry out foaming and polymerization reaction.

It will be difficult to satisfy the purpose of the present invention without keeping the above-mentioned weight ratio range of PTMG and ε-caprolactone in the copolymer (polyol-1).

If the weight ratio of PTMG and ε-caprolactone in the copolymer was beyond 80:20, microcellular polyurethane manufactured from the copolymer or PTMG only as the polyol component would have inferior durability, especially inferior bending fatigue property and not satisfactory for the vibration-proof material of car use, even though the average molecular weight of the polyol component is 1000 to 3000.

On the contrary, if the weight ratio of PTMG and ε-caprolactone in the copolymer was under 20:80, microcellular polyurethane manufactured from such copolymer or homopolymer of ε-caprolactone as the polyol component would have bad permanent set at compression and remarkable weakening phenomenon after the repeated compression durability test under heavy load, owing to large amount of heat built up. In this case too, microcellular polyurethane has not enough durability for the vibration-proof of car use, even though the average molecular weight of the polyol component is 1000 to 3000.

Besides, without copolymerization, if PTMG with an average molecular weight of 1000 to 3000 and polycaprolactone with an average molecular weight of 1000 to 3000 were simply blended by the weight ratio of 20:80 to 80:20, both polyols could not be blended homogeneously, separating in two layers on standing, even though appropriate surface active agent might improve the mutual miscibility to some extent. The prepolymer with terminal radical of NCO obtained from the polyol mixture in such a state would produce microcellular polyurethane with less bending durability and higher heat built up and not satisfactory for the vibration-proof material of car use.

To summarize above matters, the present invention has been accomplished by finding out that only the microcellular polyurethane made from polyesterpolyetherpolyol, which is a copolymer of PTMG and ε-caprolactone by the weight ratio of 20:80 to 80:20 with an average molecular weight of 1000 to 3000, has the durability for vibration-proof material of car use, combining the advantage of PTMG such as high initial modulus at elongation, low heat built up, low-temperature property and hydrolysis-durability under high humid and hot conditions, with the advantage of polycaprolactone such as good molding property and anti-bending-fatigue property, as well as making up for the disadvantage of both polyols each other.

On the other hand, polyesterpolyol (polyol-2), which is a high molecular weight condensate of adipic acid as a main acid component, does not give enough good polyurethane elastomer with remarkable low-temperature property and hydrolysis-durability under high humid and hot conditions as PTMG does. Though molded microcellular polyurethane using polyesterpolyol (polyol-2) as polyol component and MDI as isocyanate component gives good durability at anti-bending-fatigue test of the product, but its initial modulus at elongation is low and the heat built up when compressed repeatedly gives utterly weakness by its deterioration. So, its unsatisfactory durability does not fit for the vibration-proof material of car use.

One trial of taking advantage of PTMG and covering its disadvantage of bad bending durability with adipate-type polyesterpolyol has been considered to make excellent microcellular polyurethane applicable to vibration-proof material of car use, but both polyols do not blend basically each other, easily resulting in separated two layers. Even though the addition of appropriate surface active agent might improve the mutual miscibility to some extent, prepolymer with terminal radical of NCO obtained from such blended polyols would produce microcellular polyurethane with less durability and not satisfactory for the vibration-proof material of car use.

On the other hand, the blended polyol between polyesterpolyetherpolyol (polyol-1) with an average molecular weight of 1000 to 3000 made by the copolymerization of polytetramethyleneglycol (PTMG) and ε-caprolactone by the weight ratio of 20:80 to 80:20 and polyesterpolyol (polyol-2) with an average molecular weight of 1000 to 3000 made of adipic acid as a main acid component, by the weight ratio of up to 20:80, has not above-mentioned disadvantage and can make microcellular polyurethane with good durability for vibration-proof material of car use.

Products made from the blended polyol containing polyol-2 by the weight ratio of over 80:20 to polyol-1 are not satisfactory, because of their excessive heat built up by repeated compression, which causes the deterioration of properties.

Adipate type polyesterpolyol using here may be single kind of polyol or the blend of more than two kinds of adipate type polyesterpolyol.

As the isocyanate component usable for the invention, 4,4'-diphenylmethanediisocyanate is the most recommendable for the purpose from the viewpoint of safety and molding stability of the prepolymer. On the other hand, crude MDI which is called as liquid MDI, urethane-denaturated MDI or carbodiimidedenatured MDI have bad durability and excluded for the purpose of the invention.

When the prepolymer with terminal radical of NCO is prepared by reacting the polyol component containing polyester-polyetherpolyol as explained in detail and polyesterpolyol made of adipic acid as a main acid component by the weight ratio of 100:0 to 20:80, with 4,4'-diphenylmethanediisocyanate (MDI), organic chain-extending agent can be added, if necessary, to the reaction system of the prepolymer at the same time or step by step, to control freely static elasticity necessary for the vibration-proof material of car use.

In the case of the present invention, the higher the blend ratio of adipate type polyesterpolyol in blended polyol, the lower the initial modulus at elongation of microcellular polyurethane obtained. So, it is desirable to add some quantity of organic chain-extending agent to improve abovementioned trend.

As organic chain-extending agents usable for the purpose, 3,3'-dichloro-4,4'-diaminodiphenylmethane, 4,4'-diaminodiphenylmethane or other aromatic diamino-type, 1,4-butanediol, diethanolamine or other aliphatic diol type, bisphenol-A, bisphenol-F or their derivatives, hydroquinone-bis-hydroxyetherylether or other aromatic diol, or any other preknown organic chain-extending agents can be used.

While any specific kind of chain-extending agent is especially recommended, its quantity to be added should be limited as little as possible, because it brings about not only rapid increase of viscosity of the prepolymer which harm the homogeneous blending and stirring workability, but the deterioration of microcellular polyurethane properties therefrom such as bending durability, heat built up and general durability of the final product for the vibration-proof material of car use.

The prepolymer with terminal radical of NCO, made from above-mentioned polyol and 4,4'-diphenylmethane-diisocyanate (MDI) can be produced by the known technique.

The ratio of the isocyanate component to the polyol component is preferably within NCO/OH (mol ratio)=1.6 to 4.0. If the ratio was smaller than it, the prepolymer therefrom would be of high viscosity, its stirring workability would be very low and the product therefrom would have non-homogeneous foam and bad durability under constant load compression. On the other hand, if the ratio was more than 4.0, the strength of the product out of mold would be weak and hardly obtain molding stability and the elasticity of microcellular polyurethane would be lowered which brings down the durability of the product.

The prepolymer thus produced is blended with water or aqueous solution containing hydrophilic organic chain-extending agent, surface active agent, catalyst and others. Then the blended solution is vigorously stirred homogeneously to carry out foaming and polymerization reaction and produce microcellular polyurethane with the density of 0.35 to 0.70 gr./cm$^3$.

The operating method of blending and stirring and condition of its filling up to metallic mold to control the density of the product will be done by the known technique and not always necessary to appoint specific one for the purpose.

Water plays a part of not only foaming agent, but the chain-extending and polymerization (curing) agent. Quantity of water to be used depends upon the NCO % of the prepolymer, and it is necessary to take optimum quantity of water to obtain good static elastic property and enough durability under repeated compression, which are necessary properties of microcellular polyurethane for the vibration-proof material of car use.

If too much quantity of water was used, microcellular polyurethane obtained would have high rigidity, but with high heat built up, weakening by repeated compression and inferior bending durability.

On the other hand, if too little quantity of water was used, microcellular polyurethane therefrom would be too soft, with unsatisfactory static elasticity for the vibration-proof material of car use, much deformation under high compression, lower durability by repeated compression and easily breaking by fatigue.

Hydrophilic organic chain-extending agent does not work as a foaming agent, but works for improving the initial modulus of microcellular polyurethane at elongation. 1,4-butanediol, ethyleneglycol, 1,6-hexanediol and others can be used for this purpose.

Surface active agent is used for promoting the reaction between prepolymer with terminal radical of NCO and water. Besides already known silicone-type, licinolic acid sulfonate, oleic acid sulfonate or any other aliphatic sulfonate, Tween 20, 40, 60 with high HLB value or any other sorbitan type nonion surface active agent can be used for the purpose as supplement, but not always necessary to appoint specific one here.

As catalyst, appropriate quantity of amine type catalyst such as N-methylmorphorine, triethylenendiamine, tetramethylhexamethylenediamine, or any other ordinary amine type catalyst for producing polyurethane foam can be used to proceed effectively the foaming and polymerization reaction between prepolymer with NCO radical and water. But it is not always necessary to appoint specific one for this purpose.

The invention will be more clearly understood with reference to the following examples and comparative examples.

EXAMPLE 1

To 100 weight parts of polyesterpolyetherpolyol (Daicel Chemical Co.: Placcel T-2203) which is a copolymer of PTMG and ϵ-caprolactone (70:30) with an average molecular weight of 2000 and OH value=56, 2.0 weight parts of hydroquinon-bis-hydroxyethylether (Mitsui Petrochemical Co.: BHEB) were added as a chain-extending agent, melted, dehydrated by heating, then added 33.3 weight parts of MDI (Mitsui Nisso Urethane Co.: MDI-PH) to react at 120° C., and semi-transparent prepolymer with NCO%=4.54% was prepared.

To 135.3% weight parts of this prepolymer, after adjusting their temperature to 100° C. 2.5 weight parts of Additive SV, (Sumitomo Bayer Co.: 50% aqueous solution of aliphatic acid sulfonate) and 0.01 weight part of DABCO 33LV (Nippon Nyukazai Co.) were added as foaming and polymerization agents, then the mixture was stirred vigorously to homogeneous state and filled into a metallic mold preheated at 100° C. to form microcellular polyurethane. The product was taken out of the mold and secondary-cured at 100° C. for 20 hrs.

EXAMPLE 2

100 weight parts of polyesterpolyetherpolyol (Daicel Chemical Co.: Placcel T-2205) which is a copolymer of PTMG and ϵ-caprolactone (50:50) with an average molecular weight of 2000 and OH value=56 were used as polyol component.

After preparing prepolymer in much the same way as Example 1, microcellular polyurethane was obtained from it by foaming and polymerization process.

COMPARATIVE EXAMPLE 1

100 weight parts of polyethyleneadipatepolyester (Nihon polyurethane Co.: Nippolan 4040) with an average molecular weight of 2000 and OH value=56 were dehydrated by heating, added 24.0 weight parts of NDI (Sumitomo Bayer Co.: Desmodule 15) to react at 120° C., and transparent amber-like prepolymer with NCO%=4.36% was prepared.

To 124 weight parts of this prepolymer, 2.2 weight parts of Additive SV (Sumitomo Bayer Co.: 50% aqueous solution of aliphatic acid sulfonate) were added as a foaming and curing agent, then the mixture was stirred vigorously to homogeneous state and filled into a matallic mold preheated at 100° C. to form microcellular polyurethane. The product was taken out of the mold and secondary-cured at 100° C. for 20 hrs.

COMPARATIVE EXAMPLE 2

To 100 weight parts of polyethyleneadipatepolyester (Nihon polyurethane C.: Nippolan 4040) with an average molecular weight of 2000 and OH value=56, 2.0 weight parts of hydroquinon-bis-hydroxyethylether (Mitsui Petrochemical Co.: BHEB) were added as a chain-extending agent, melted, dehydrated by heating, then added 33.3 weight parts of MDI (Mitsui Nisso Urethane C.: MDI-PH) to react at 120° C., and semi-transparent white colored prepolymer with NCO%=4.54% was prepared.

To 135.3 weight parts of this prepolymer, 2.5 weight parts of Additive SV (Sumitomo Bayer Co. 50% aqueous solution of aliphatic acid sulfonate) were added as a foaming and curing agent, then stirred vigorously to homogeneous state, and microcellular polyurethane was prepared from it in much the same way as Comparative Example 1.

COMPARATIVE EXAMPLE 3

To 100 weight parts of PTMG (Nihon Polyurethane Co.: PTG-500) with an average molecular weight of 2000 and OH value=56, 2.0 weight parts of hydroquinone-bis-hydroxyethylether (Mitsui Petrochemical Co.: BHEB) were added as a chain-extending agent, dehydrated by heating, prepared prepolymer in much the same way as Example 1, and microcellular polyurethane was obtained from it by foaming and polymerization.

COMPARATIVE EXAMPLE 4

To 100 weight parts of polycaprolactone (Daicel Chemical CO.: Placcel P-220) with an average molecular weight of 2000 and OH value=56, 2.0 weight parts of hydroquinone-bis-hydroxyethylether (Mitsui Petrochemical Co.: BHEB) were added as a chain-extending agent, dehydrated by heating, prepared prepolymer in much the same as Example 1, and microcellular polyurethane was obtained from it by foaming and polymerization.

Main components of prepolymer in each example and comparative example and measured results of physical properties about those samples are shown in Table 1.

The following methods are applied to measure physical properties;

\# modulus at 100% elongation, tensile strength and elongation at break—based on JIS K-6301, No. 3 Dumbell.

\# tear strength—based on JIS K-6301, B type Dumbell.

\# permanent set at 50% compression (Cs)—based on JIS K-6301.

$$Cs = \frac{t_0 - t_1}{t_0 - t_s} \times 100(\%)$$

here;

$t_0$: Thickness of sample before testing;

$t_1$: Thickness of sample when elapsed 30 min. after compressed to 50% thickness for 22 Hrs. at 70° C. and then load was removed;

$t_s$: Thickness of spacer.

\# De Mattia bending durability—sample; 25 mm width×110 mm length×7 mm thickness. After bending sample by 200 times per min., measure the number of times until minute crack is appeared on the surface of the sample.

\# internal heat built up—Sample; 30 mm diameter, 30 mm height. Using Goodrich flexometer, measure the temperature rising (T°C.) of center part of sample, after 2 min. testing with repeated compression of 50%, 30 Hz.

\# hydrolysis-durability under humid and hot condition—On standing the sample in water vapor at 180° C. for 120 min., the deterioration degree of sample with the lapse of time is compared with 100% tensile modulus before testing and by the retention of elongation.

\# product durability and set by fatigue—sample; outside diameter 55 mm, inside diameter 18 mm, 90 mm length cylindrical shape having two constricted portion. compressing (compression ratio 75%) axially with 400 Kg weight repeatedly at a frequency of 2 times per second up to 300,000 times while cooling with dried air at room temperature, measure the number of times when the sample was destroyed (product durability), and diminution rate (%) of the length (set by fatigue) when the sample was preserved.

TABLE 1

|  |  | Example | | Comparative Example | | | |
|---|---|---|---|---|---|---|---|
|  |  | 1 | 2 | 1 | 2 | 3 | 4 |
| Main component of prepolymer | polyethyleneadipate |  |  | 100 | 100 |  |  |
|  | polytetramethyleneglycol |  |  |  |  | 100 |  |
|  | polycaprolactone |  |  |  |  |  | 100 |
|  | PTMG/caprolactone (70/30) | 100 |  |  |  |  |  |
|  | PTMG/caprolactone (50/50) |  | 100 |  |  |  |  |
|  | isocyanate component | MDI | MDI | NDI | MDI | MDI | MDI |
| Physical properties | density (g/cm$^3$) | 0.51 | 0.51 | 0.50 | 0.51 | 0.50 | 0.51 |
|  | modulus at 100% elongation (Kg/cm$^2$) | 16 | 16 | 19 | 16 | 18 | 16 |
|  | tensile strength (Kg/cm$^2$) | 70 | 65 | 65 | 70 | 60 | 70 |
|  | elongation at break (%) | 550 | 550 | 420 | 450 | 450 | 550 |
|  | tear strength (Kg/cm) | 30 | 26 | 33 | 30 | 28 | 30 |

TABLE 1-continued

|  | Example | | Comparative Example | | | |
|---|---|---|---|---|---|---|
|  | 1 | 2 | 1 | 2 | 3 | 4 |
| permanent set at 50% compression: Cs (%) | 13 | 15 | 12 | 15 | 13 | 17 |
| De Mattia bending durability (10,000 times) | 50 up | 50 up | 50 up | 30 | 4 | 50 up |
| internal heat built up: T (°C.) | 130 | 150 | 115 | 195 | 125 | 210 |
| product durability (1,000 times) | 30 up | 20 | 30 up | 10 | <1 | 30 up |
| set by fatigue (%) | 4.0 |  | 3.0 |  |  | 22.5 |
| Tg (°C.) (low-temperature property) | −54 | −50 | −26 | −21 | −55 |  |

EXAMPLE 3

50 weight parts of polyesterpolyetherpolyol (Daicel Chemical CO.: Placcel P-2203) which is a copolymer of polytetramethyleneglycol (PTMG) and ε-caprolactone by the weight ratio of 70:30 and with an average molecular weight of 2000 and OH value=56, 50 weight parts of polyethylene-butyleneadipatepolyester (Nihon Polyurethane Co.: Nippolan 4042) with an average molecular weight 2000 and OH value=56 and 2.0 weight parts of hydroquinone-bis-hydroxyethylether (Mitsui Petrochemical Co.: BHEB) as a chain-extending agent were blended, melted, dehydrated by heating, then reacted with 33.3 weight parts of MDI (Mitsui Nisso Urethane Co.: MDI-PH) at 120° C., and semitransparent white colored prepolymer with NCO%=4.54% was prepared.

To 135.3 weight parts of this prepolymer, 2.5 weight parts of Additive SV (50% aqueous solution of aliphatic acid sulfonate), 0.4 weight part of silicone surfactant (Nihon Unicar Co.: L-532=0.2 weight part, L-5420=0.2 weight part) and 0.02 weight part of DABCO 33LV (Nippon Nyukazai Co.) were added, stirred vigorously to homogeneous state, then the mixture was filled into a metallic mold preheated at 100° C. to form microcellular polyurethane. The product was taken out of the mold and secondary-cured at 100° C. for 20 hrs.

EXAMPLE 4

To 135.3 weight parts of the prepolymer prepared in much the same way as Example 3, 2.5 weight parts of Additive SV, 0.6 weight part of silicone surfactant (Nihon Unicar Co.: L-532=0.3 weight part, L-5420=0.3 weight part) and 0.02 weight part of DABCO 33LV were blended, and microcellular polyurethane was prepared in much the same way as Example 3.

COMPARATIVE EXAMPLE 5

To 100 weight parts of polyethylenebutyleneadipatepolyester (Nihon Polyurethane Co.: Nippolan 4042) with an average molecular weight of 2000 and OH value=56, 2.0 weight parts of hydroquinone-bis-hydroxyethylether (Mitsui Petrochemical Co.:BHEB) were added as a chain-extending agent, melted, dehydrated by heating, then added 33.3 weight parts of MDI (Mitsui Nisso Urethane Co.: MDI-PH) to react at 120° C., and semitransparent white colored prepolymer with NCO%=4.54% was prepared.

To 135.3 weight parts of this prepolymer, 2.5 weight parts of Additive SV (Sumitomo Bayer Co.: 50% aqueous solution of aliphatic acid sulfonate) were added as a foaming agent, then the mixture was stirred vigorously to homogeneous state and filled into a metallic mold preheated at 100° C., microcellular polyurethane obtained out of mold was secondary-cured at 100° C. for 20 hrs.

COMPARATIVE EXAMPLE 6

To the mixture of 50 weight parts of polyethylenebutyleneadipatepolyester (Nihon Polyurethane Co: Nippolan 4042) with an average molecular weight of 2000 and OH value=56 and 50 weight parts of polytetramethyleneglycol (Nihon Polyurethane Co.: PTG-500) with an average molecular weight of 2000 and OH value=56, 2.0 weight parts of hydroquinone-bis-hydroxyethylether (Mitsui Petrochemical Co.: BHEB) were added as a chain-extending agent, melted, dehydrated by heating, and microcellular polyurethane was prepared from it by foaming and polymerization in much the same way as Comparative Example 5.

Main components of prepolymers in Example 3 & 4 and Comparative Example 1 & 2 and measured results of physical properties about those samples are shown in Table 2.

TABLE 2

|  |  | Example | | Comparative Example | |
|---|---|---|---|---|---|
|  |  | 3 | 4 | 5 | 6 |
| Main component of prepolymer | polyethylenebutyleneadipate | 50 | 50 | 100 | 50 |
|  | polytetramethyleneglycol (PTMG) |  |  |  | 50 |
|  | PTMG/caprolactone (70/30) | 50 | 50 |  |  |
|  | isocyanate component | MDI | MDI | MDI | MDI |
| Physical properties | density (g/cm$^3$) | 0.51 | 0.51 | 0.52 | 0.50 |
|  | modulus at 100% elongation (Kg/cm$^2$) | 17 | 17 | 15 | 17 |
|  | tensile strength (Kg/cm$^2$) | 67 | 73 | 70 | 65 |
|  | elongation at break (%) | 530 | 560 | 510 | 480 |
|  | tear strength (Kg/cm) | 27 | 29 | 25 | 26 |
|  | permanent set at 50% compression: Cs (%) | 13 | 14 | 12 | 17 |
|  | De Mattia bending durability (10,000 times) | 80 | 100 | 20 | 1 |
|  | internal heat built up: T (°C.) | 145 | 150 | 185 | 190 |
|  | product durability (1,000 times) | 30 up | 30 up | 15* | 1* |
|  | weakening by fatigue (%) | 4.0 | 4.5 |  |  |
|  | Tg (°C.) (low-temperature resistance) | −31 | −31 | −26 | −27 |

*destructed

Figure 2:
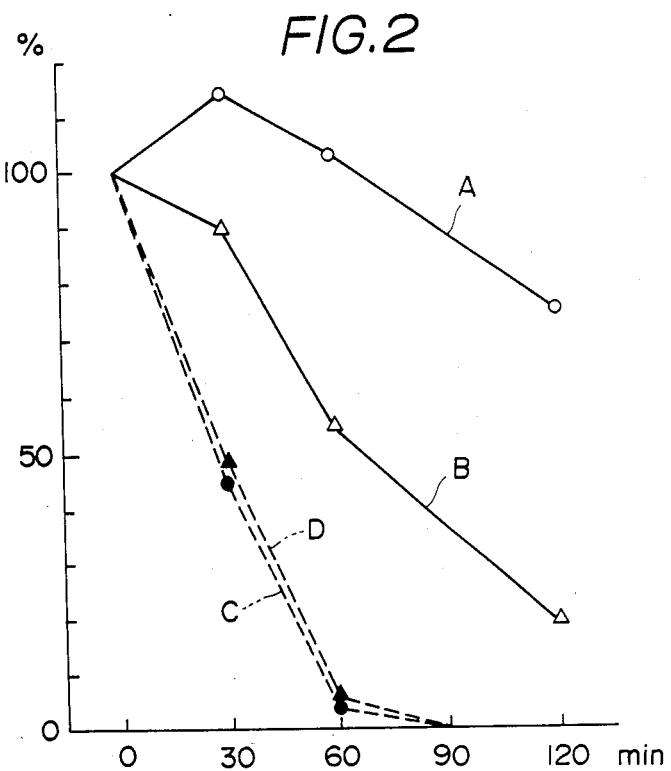
FIG. 2 shows the change of retention rate of elongation strength with the lapse of time.

Measured results of hydrolysis durability under humid and hot condition about the products in Example 1 & 3 and Comparative Example 1 & 2 are shown in FIGS. 1 & 2.

In FIG. 1, horizontal axis shows the elapsed time (min.) on standing in water vapor at 180° C. and vertical axis shows the retention rate (%) of modulus at 100% elongation.

In FIG. 2, horizontal axis shows the elapsed time (min.) and vertical axis shows the retention rate (%) of elongation strength.

In each Figures, marks on Line A show the data corresponding to Example 1, marks on Line B to Example 3, marks on Line C to Comparative Example 1 and marks on Line D to Comparative Example 2 respectively.

FIG. 1 illustrates that microcellular polyurethane of Example 1 & 3 show better retention rate (%) of modulus at 100% elongation than those of Comparative Example 1 & 2, and FIG. 2 illustrates that microcellular polyurethane of Example 1 & 3 show better retention rate (%) of elongation rate than those of Comparative Example 1 & 2.

By using polyesterpolyetherpolyol which is a copolymer of PTMG and ε-caprolactone, while maintaining the advantages of PTMG (Rigidity, Initial modulus at elongation, Low heat built up, Low temperature property and Hydrolysis-durability under high humid and hot condition), its disadvantage (bad bending durability) can be improved.

Furthermore, by blending the above-mentioned polyesterpolyetherpolyol with polyesterpolyol which is a condensate consist of adipic acid as a main acid component, polyol blend with improved mutual solubility can be obtained, which is then reacted with MDI to prepare prepolymer with terminal radical NCO and by reacting the prepolymer with aqueous type foaming and polymerization (curing) agent, microcellular polyurethane with both advantages of PTMG and polyesterpolyol can be obtained.

We claim:

1. In a microcellular polyurethane elastomer produced by foaming and polymerization reaction of prepolymer with terminal radical of NCO prepared by the reaction of polyol component and isocyanate component, the improvement comprising; the polyol component essentially consists of polyester-polyetherpolyol containing polyesterpolyol by the weight ratio of 100:0 20:80, in which the polyesterpolyetherpolyol is a copolymer of polytetramethyleneglycol and ε-caprolactone by the weight ratio of 20:80 to 80:20 with an average molecular weight of 1000 to 3000 and the polyesterpolyol is a condensate of adipic acid as a main acid component with an average molecular weight of 1000 to 3000, and the isocyanate component essentially consists of 4,4'-diphenylmethanediisocyanate.

2. A microcellular polyurethane elastomer according to claim 1, in which molar ratio of NCO radical in the isocyanate component to OH radical in the polyol component is 1.6 to 4.0.

3. A microcellular polyurethane elastomer according to claim 2, in which the polyesterpolyetherpolyol is a copolymer of polytetramethyleneglycol and ε-caprolactone by the weight ratio of 50:50 to 30:70.

4. A microcellular polyurethane elastomer according to claim 2, in which the average molecular weight of polyesterpolyetherpolyol is 1500 to 2500.

5. A microcellular polyurethane elastomer according to claim 2, in which the average molecular weight of polyesterpolyol is 1500 to 2500.

6. A microcellular polyurethane elastomer according to claim 2, the density of which is 0.35 to 7.0 gr./cm$^3$.

7. A manufacturing method of microcellular polyurethane elastomer comprising; a polyol component which consists of polyesterpolyetherpolyol containing polyesterpolyol by the weight ratio of 100:0 to 20:80, in which the polyesterpolyetherpolyol is a copolymer of polytetramethyleneglycol and ε-caprolactone by the weight ratio of 20:80 to 80:20 with an average molecular weight of 1000 to 3000 and the polyesterpolyol is a condensate of adipic acid as a main acid component with an average molecular weight of 1000 to 3000, is reacted with 4,4'-diphenylmethanediisocyanate as an isocyanate component to make a prepolymer with terminal radical of NCO, and to the prepolymer thus made, water as a main component of foaming and polymerization agent is added and stirred homogeneously to carry out foaming and polymerization reaction.

8. A manufacturing method of microcellular polyurethane elastomer according to claim 7, in which molar ratio of NCO radical in the isocyanate component to OH radical in the polyol component is adjusted to the value from 1.6 to 4.0.

9. A manufacturing method of microcellular polyurethane elastomer according to claim 8, in which the polyester-polyetherpolyol is a copolymer of polytetramethyleneglycol and ε-caprolactone by the weight ratio of 50:50 to 30:70.

10. A manufacturing method of microcellular polyurethane elastomer according to claim 8, in which the average molecular weight of polyesterpolyetherpolyol is 1500 to 2500.

11. A manufacturing method of microcellular polyurethane elastomer according to claim 8, in which the average molecular weight of polyesterpolyol is 1500 to 2500.

* * * * *